Aug. 30, 1966 J. B. KOHLER 3,269,178
PAPER MACHINE FLAW DETECTING AND MARKING APPARATUS
Filed Aug. 2, 1963 7 Sheets-Sheet 2

INVENTOR.
John B. Kohler
BY
Frease, Bishop, Johns & Schick
ATTORNEYS

Aug. 30, 1966    J. B. KOHLER    3,269,178
PAPER MACHINE FLAW DETECTING AND MARKING APPARATUS
Filed Aug. 2, 1963    7 Sheets-Sheet 3

INVENTOR.
John B. Kohler
BY
Frease, Bishop, Johns & Schick
ATTORNEYS

Aug. 30, 1966   J. B. KOHLER   3,269,178
PAPER MACHINE FLAW DETECTING AND MARKING APPARATUS
Filed Aug. 2, 1963   7 Sheets-Sheet 5

INVENTOR.
John B. Kohler
BY
Frease, Bishop, Johns & Schick
ATTORNEYS

INVENTOR.
John B. Kohler
BY
Frease, Bishop, Johns & Schick
ATTORNEYS

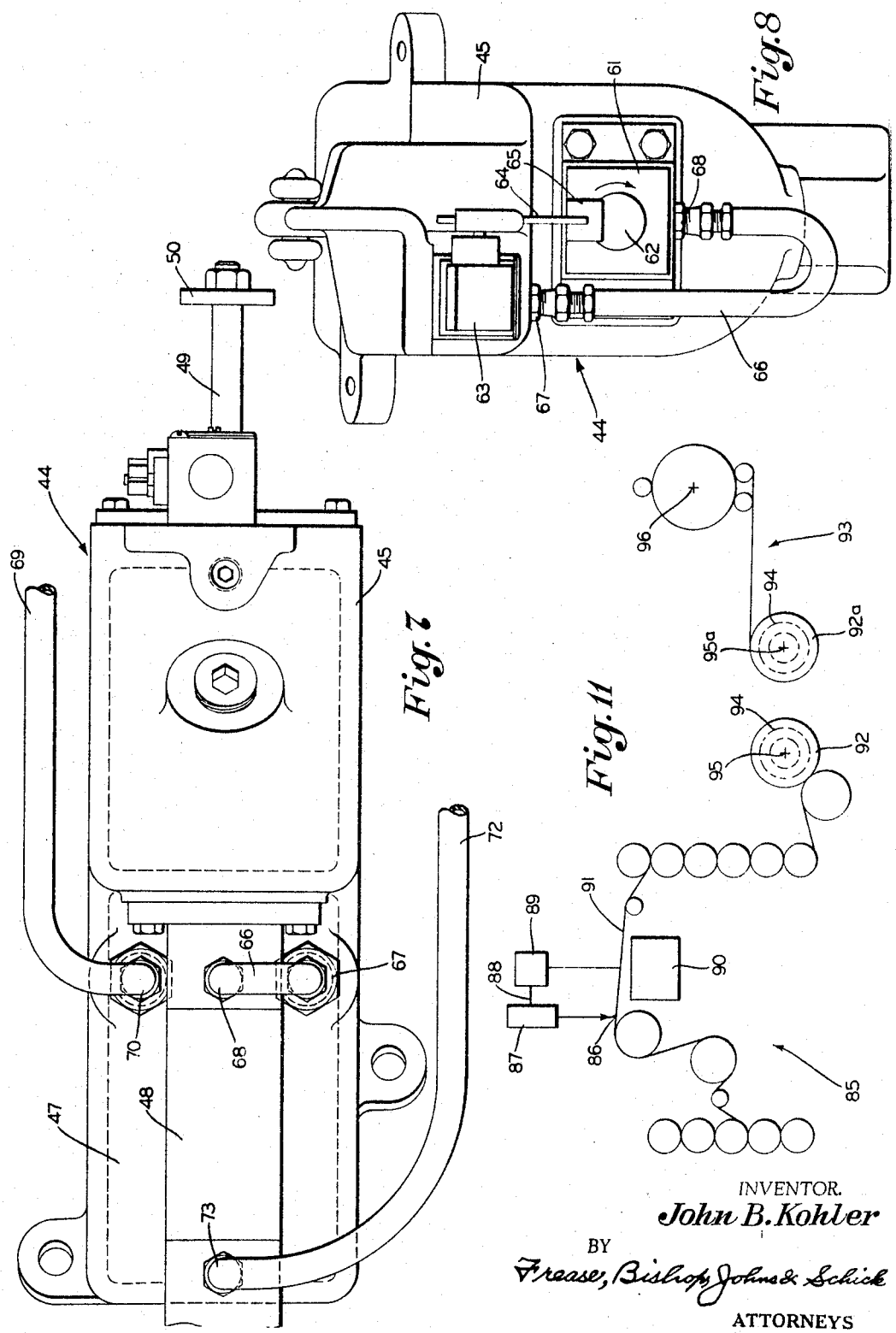

3,269,178
PAPER MACHINE FLAW DETECTING AND
MARKING APPARATUS
John B. Kohler, North Canton, Ohio, assignor to The
Kohler Coating Machinery Corporation, Greentown,
Ohio, a corporation of Ohio
Filed Aug. 2, 1963, Ser. No. 299,605
7 Claims. (Cl. 73—159)

The invention relates generally to continuous web paper making machinery, and more particularly to apparatus for detecting and marking or recording flaws at any place in the paper web while the web is moving continuously at high speed.

Flaws inevitably develop in paper of various types and kinds produced on continuous web paper making machinery. The types of flaws of concern are those producing local discontinuities in surface, substance, color or other characteristic, which will adversely affect appearance, printability, usefulness, or operability in subsequent processing or use of the paper containing such flaws.

Paper areas containing flaws must be removed from the continuous web product of a paper machine. The paper product of a paper machine thus must be inspected to determine the existence and general location of such flaws. The paper machine cannot be stopped to make such inspection or for the removal of flaws. However, it is desirable to inspect the paper product of a paper machine as early as possible during processing of the paper so that flaw-containing areas can be eliminated without further processing of rejectable material; and so that the cause of the flaw can be detected and corrected as soon as possible.

Generally, flaws have been detected in many ways, either as a visual manual operation or by the use of various types of mechanical, electrical or light intensity flaw detector equipment to locate holes, coating skips, lumps, wrinkles, spots, etc.

Heretofore, inspection for and detection of flaws has been carried out as a visual manual operation during rewinding, when the web is moved slowly enough for such visual inspection. Also, flaw inspection has been performed as a part of a sorting or sheeting operation when a continuous web is cut into sheets and piled. Rejected sheets are sorted and eliminated at the cutter by an inspection device located adjacent the cutter. Many of the indicated types of flaw detectors have been used for inspection during further processing of the rolled product of a paper machine.

Another flaw detection and signalling procedure has been carried out by a paper machine operator who watches the web moving through the paper machine for flaws. When a flaw is visually detected, the operator throws a "flag" (a piece of colored paper) into the crotch of the winding reel. When the rolled product of the paper machine is rewound, the "flag" signals the presence of a flaw.

Recently, an electronic optical flaw detector has been used in connection with a sorting sheet cutter to detect and signal the existence of a flaw. The signal is conveyed to a memory wheel mounted on the cutter which automatically diverts sheets previously rejected by the electronic detector. Flaw detection on sorting sheet cutters involves the limitations of the sheet cutters in speed capacity arising from the problems of single sheeting and laying, which are vastly complicated by sorting, and even more vastly complicated by selective sorting across the web.

Although such prior flaw-detection procedures have been useful, they have not satisfied the general need first, to detect flaws in the continuous paper web as early as possible during processing, that is during passage through a high speed paper machine, and second, without unrolling or rewinding the rolled paper product of the paper machine, to utilize the inspection information obtained to correct the source of trouble as quickly as possible, and to visibly indicate the existence and general location of flaws present in the rolls of paper produced.

The importance of visibly indicating the existence of flaws in a roll without unrolling cannot be underestimated. If no flaws are found on high speed inspection of the web while the web proceeds through the paper machine, no visible flaw-signal will be given. The absence of a visible flaw-signal on the produced roll of paper then indicates that the roll may be further processed without regard to flaws and without further processing of flaw-containing areas.

On the other hand, if flaws are visibly indicated exteriorly of a roll of paper produced by a paper machine, the visible signal can be used to rapidly and visually grade the rolls as to the number of flaws present in each. Further, a flaw-signal of sufficient length, if made on the edge of the web, is visible even on a rapidly revolving reel as it unwinds. Such a signal can be used during rewinding of the roll to give visual advanced notice of the approach of a flaw-containing zone so that rewinding can proceed rapidly except when approaching a signalled flaw-containing zone. Rewinding then can proceed at reduced speed and the web movement controlled when the flaw-containing zone is reached so that the rejected material can be eliminated.

Attempts to satisfy the existing need have involved the use of an electronic flaw detector in connection with high speed paper machine operation and the triggering of an inking device by a flaw passing the electronic detector to put an ink mark on a surface of the web adjacent its edge to indicate the presence of a flaw.

This expedient has not satisfied both aspects of the indicated need (flaw detection and visible signalling exteriorly of the paper machine product in roll form) first, because the ink mark can offset on adjacent wraps of the web when collected in roll form (thus producing an additional flaw) and second, because the ink mark is not visible exteriorly of the roll of paper produced by the paper machine. Therefore, a rewinding or other operation must be carried out to locate the flaw which has been marked.

Thus, there is an existing and unsatisfied need in the paper industry for cooperatively, detecting the presence of flaws in the continuous web of paper passing through a high speed paper machine, and indicating on the web itself in a manner visible externally of rolls of paper produced by the paper machine the existence and location of detected flaws; so that flaw-containing areas in rolls of paper produced by the paper machine can be located quickly and removed.

I have discovered a solution to this problem which includes providing a high speed continuous web paper machine with an electronic flaw detector having cross web scanning devices which can detect flaws at any place in the paper web without limiting or slowing down web speed and without altering paper machine control or operation in any manner; providing chalk marking devices for marking an edge of the web, as distinguished from a surface of the web, during continuous movement of the web with selective chalk marks to indicate the presence as well as the location of flaws, so as to form for each flaw a flaw-indication and location signal visible externally at an end of a roll of paper produced by the paper machine; and providing means for actuating each chalk marking device by a signal produced by a related flaw detecting scanning device operatively connected with such chalk marking device.

Accordingly, it is an object of the present invention to provide new paper machine flaw detecting and marking apparatus by which flaws present in the paper produced on a high speed continuous web paper machine may be detected and their presence immediately marked on an edge of the web during continuous high speed web movement.

Furthermore, it is an object of the present invention to provide new paper machine flaw detecting and marking apparatus which can be installed on existing paper machines.

Also, it is an object of the present invention to provide new paper machine flaw detecting and marking apparatus which may be operated effectively and selectively to mark and record the existence and location of all flaws in a high speed paper machine continuously moving paper web, without damage to the web, and without interfering with proper continuous operation of the paper machine.

Moreover, it is an object of the present invention to provide new flaw detecting and marking apparatus for high speed continuous web paper machines which detects flaws and marks for each flaw a flaw indication and location signal visible externally at an end of rolls of paper produced by such paper machines.

Furthermore, it is an object of the present invention to provide a new correlated flaw detecting and marking apparatus for paper machines which eliminates the necessity of deferring flaw detection until a slow speed paper processing operation is carried out; which eliminates the necessity of processing flaw-containing zones in paper rolls produced on a paper machine until flaw detection is carried out in a subsequent operation; and which avoids the necessity of reprocessing flaw-free rolls of paper produced on a paper machine for flaw detection.

Also, it is an object of the present invention to provide new paper machine flaw detecting and marking apparatus which can be used on a high speed continuous web paper machine to detect the presence of flaws as early as possible during the manufacture of paper products so that the cause of flaws can be corrected as soon as possible and so that flaw-containing areas can be eliminated without further processing of rejectable material.

In addition, it is an object of the present invention to provide a new chalk marking construction for paper machines by which chalk signal marks may be applied to the edge of a continuous moving web, as distinguished from a surface of the web, travelling in high speed substantially instantaneously in coordination with the matter being signalled to indicate generally both the lateral and longitudinal location of the signalled matter on the web.

Also, it is an object of the present invention to provide new paper machine flaw detecting and marking apparatus which enables 100 percent of the product of paper machines to be inspected, which eliminates hand sorting except for salvage purposes only, which visibly indicates the quality of the paper product whether in rolls or sheets, which detects trouble on a paper machine as soon as it starts and enables correction of the trouble as soon as possible, which reduces production costs, and which enables upgrading of the final product.

Likewise, it is an object of the present invention to provide new paper machine flaw detecting and marking apparatus which can be used on high speed machines, not only primarily on paper machines but also on winders or rewinders or on supercalenders, as conditions may warrant.

Finally, it is an object of the present invention to provide new paper machine flaw detecting and marking apparatus which eliminates difficulties heretofore encountered in the art; achieves the stated objects in a simple, effective and inexpensive manner; improves paper making operations and the quality of product produced and reduces costs thereof; and solves problems and satisfies needs existing in the art.

These and other objects and advantages apparent to those skilled in the art from the following description and claims may be obtained, the stated results achieved, and the described difficulties overcome, by the apparatus, combinations, parts, elements, subcombinations, arrangements, constructions, and correlation of elements which comprise the present invention, the nature of which is set forth in the following general statement, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the improved paper machine flaw detecting, marking and recording apparatus of the invention may be stated in general terms as including in a high speed continuous web paper machine, the combination: of electronic flaw detector means having one or more light actuated web scanning devices adapted preferably through coincidence circuitry to signal the passage of a detected flaw on a continuously moving paper web past any scanning device; of chalk marking means including one or more chalk marking devices, equal in number to the number of scanning devices, for marking an edge of the web during continuous web movement with selective chalk marks to indicate the presence as well as the location of detected flaws so as to form for each flaw a flaw indication and location signal or record visible externally at an end of a roll of paper produced by the paper machine; and of control means operatively connecting a scanning device with a related chalk marking device whereby any chalk marking device may be actuated by the electronic signal initiated in the circuitry of its related scanning device; each chalk marking device preferably including a longitudinally and rotatably movable chalk holder, means for moving the chalk holder longitudinally in one direction to engage a chalk member held thereby with the edge of a continuously moving paper web, means for stopping chalk holder movement in said one direction when engagement between the chalk member and web edge has been established, means for moving the chalk holder longitudinally in the other direction and coincidentally rotating the chalk holder, and said control means controlling operation of said chalk holder movements.

By way of example, an embodiment of the improved flaw detecting, marking and recording apparatus is illustrated in the accompanying drawings forming part hereof in which:

FIG. 7 is a bottom plan view of the chalk marker shown in FIG. 6;

FIG. 8 is an end view of the chalk marker shown in FIGS. 6 and 7;

FIG. 11 is a diagrammatic view illustrating uses of the improved flaw detecting and marking apparatus of the invention.

Similar numerals refer to similar parts throughout the various figures of the drawings.

The invention is illustrated and described herein in connection with the installation of the improved flaw detecting and marking apparatus on a high speed continuous web paper machine where it is preferred that the inspection shall be carried out. It is understood, however, that the improved flaw detecting and marking apparatus also may be used, if desired, by installing the apparatus in connection with a winder or rewinder or on a supercalender as conditions may warrant.

Figure 1:
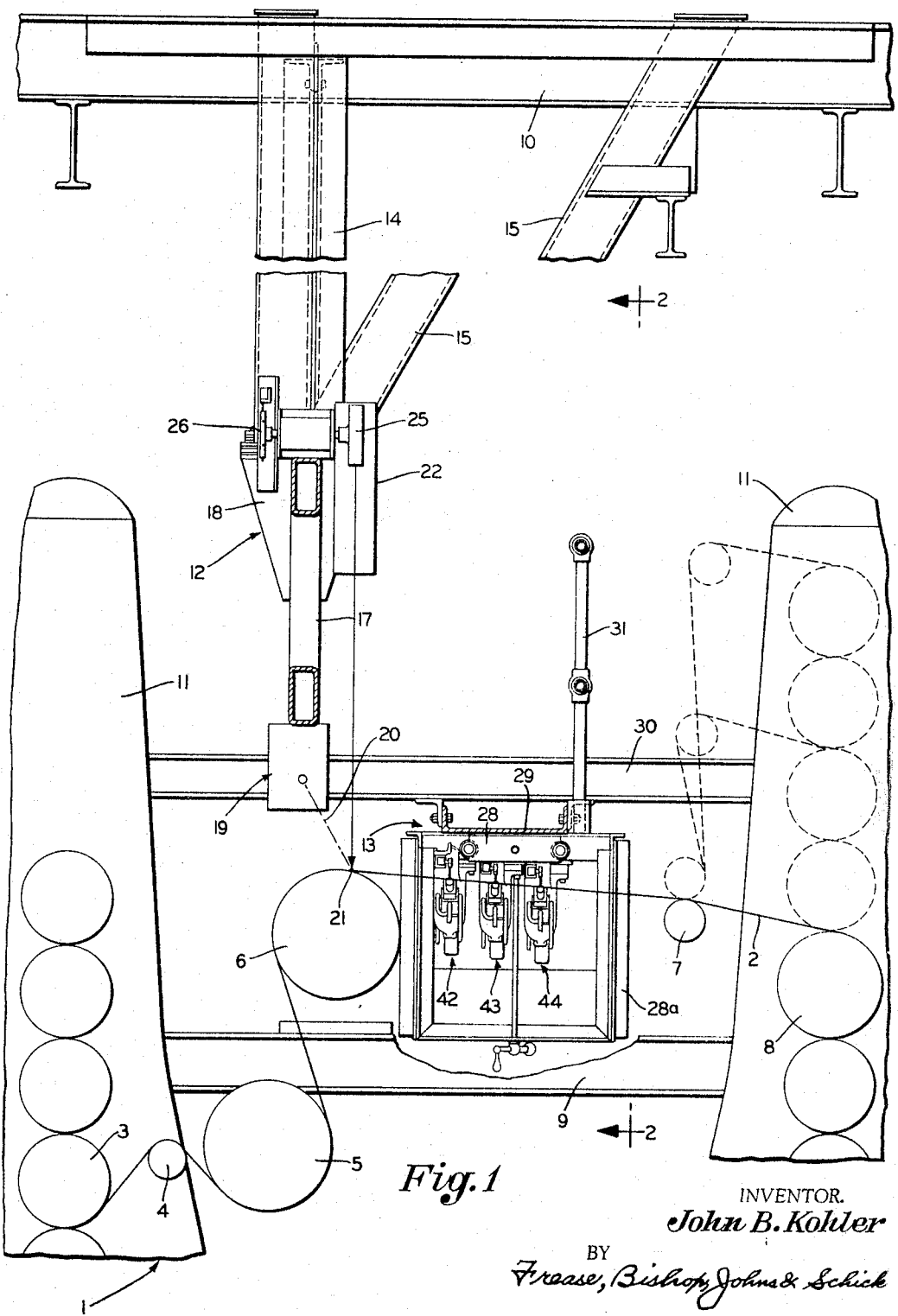
FIGURE 1 is a fragmentary somewhat diagrammatic view of a paper machine equipped with the new flaw detecting and marking apparatus.
Figure 2:
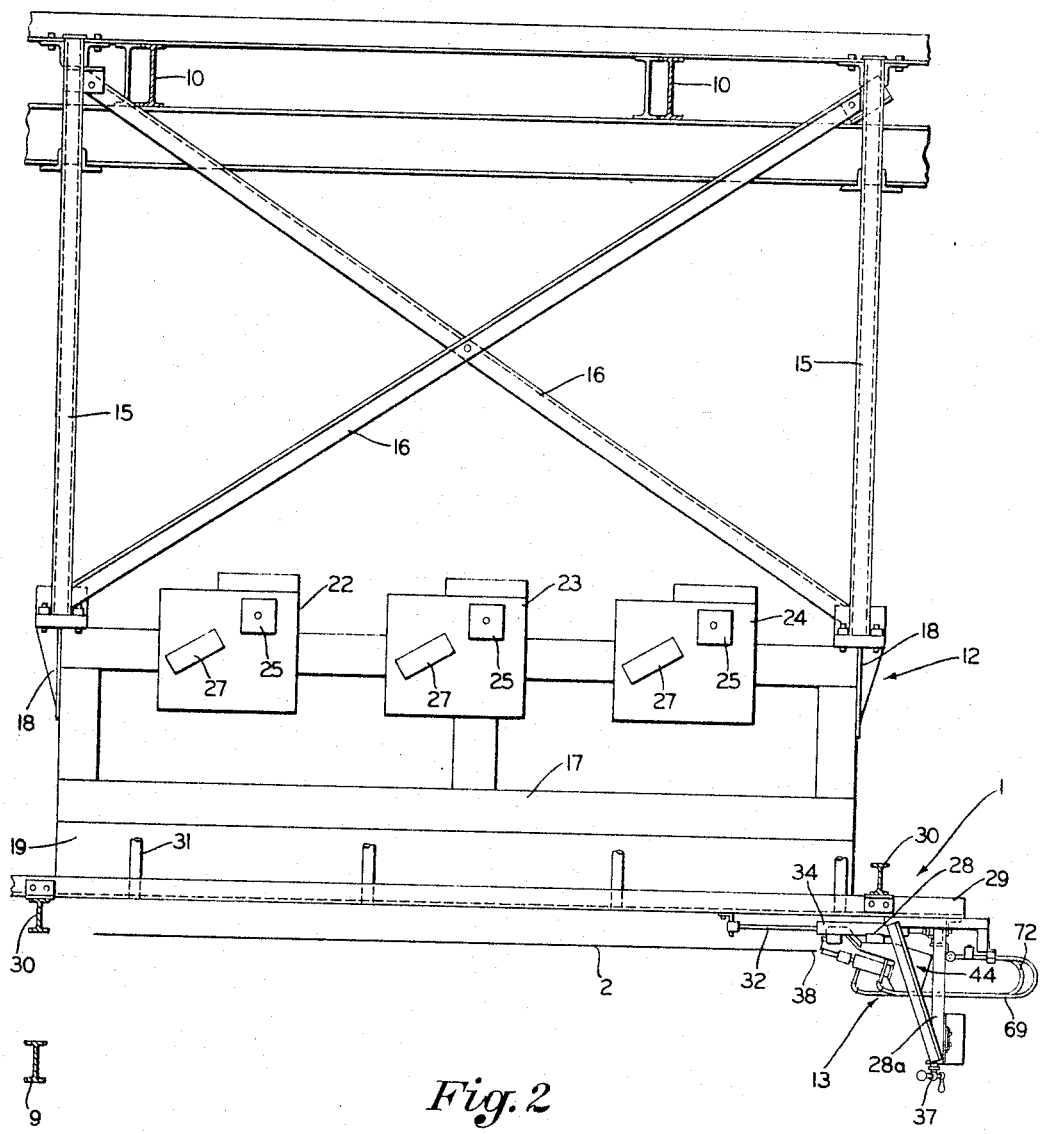
FIG. 2 is a sectional view of the parts shown in FIG. 1 looking in the direction of the arrows 2—2, FIG. 1.

A high speed paper machine is indicated generally at 1 in FIGS. 1 and 2 wherein a continuous web 2 is conveyed at high speed through the machine by paper machine rolls 3, 4, 5, 6, 7 and 8. The paper machine 1 includes usual frame structure beams 9 and 10 and suitable housings 11 for calender rolls 3 and 8.

In accordance with the invention, a scanning device generally indicated at 12 and a chalk marking device generally indicated at 13 are mounted on the paper machine 1 at a suitable location along the path of web travel.

The scanning device 12 preferably is mounted on suitable framework hung from roof beams 10, such as spaced downwardly extending vertical members 14, strut members 15 and cross braces 16 suspended from channels 10. A preferably rectangular frame 17 is supported by side plates 18 at the lower ends of vertical members 14. A source of light, indicated generally at 19 adapted to direct light rays indicated by dot-dash line 20 to strike the web 2 along a line or zone 21 extending crosswise of the web, preferably is mounted on the lower member of rectangular frame 17.

The scanning device 12 includes a series of scanners 22, 23 and 24 mounted on the upper member of rectangular frame 17. Scanners 22, 23 and 24 each preferably include a rotatable series of mirrors 25 located directly above area 21, means 26 to rotate the mirrors, and photoelectric means 27 actuated by light rays reflected by the mirrors from the illuminated area 21 scanned by the mirrors as the mirrors rotate.

The flaw detecting means scanners and circuitry may be constructed as illustrated and described in Patent No. 2,812,447. If the paper web is relatively narrow, only one scanner 22 would be used. However, where the paper web is relatively wide, say 147 inches in width for example as illustrated, three scanners preferably are used each scanning a longitudinal zone of the web. The width of the zones may be determined by or in relation to the slitting pattern and may be equal or unequal. For convenience, the illustrated scanners 22, 23 and 24 each scan approximately ⅓ of the width of the paper web 2. The scanners illustrated are of the cross web type. Considering the left hand of FIG. 2 as the front of paper machine 1, scanner 22 scans the front third of the paper web, scanner 23 scans the center third of the paper web, and scanner 24 scans the back third of web 2.

The electronic scanners 22, 23 and 24 each generate an electronic output signal whenever a flaw in web 2 passes through the zone 21 scanned by any scanner.

Referring to FIGS. 1 and 2, the chalk marking device 13 preferably includes a frame 28 adjustably supported from a channel 29 mounted on paper machine beam 30 at the back of the paper machine (to the right in FIG. 2). Channel 29 also may form a cross walk, protected by rail 31 for convenient access to the light means 19 and scanners 22, 23 and 24 so that necessary adjustments of these elements may be made when required while the paper machine is running.

Figure 3:
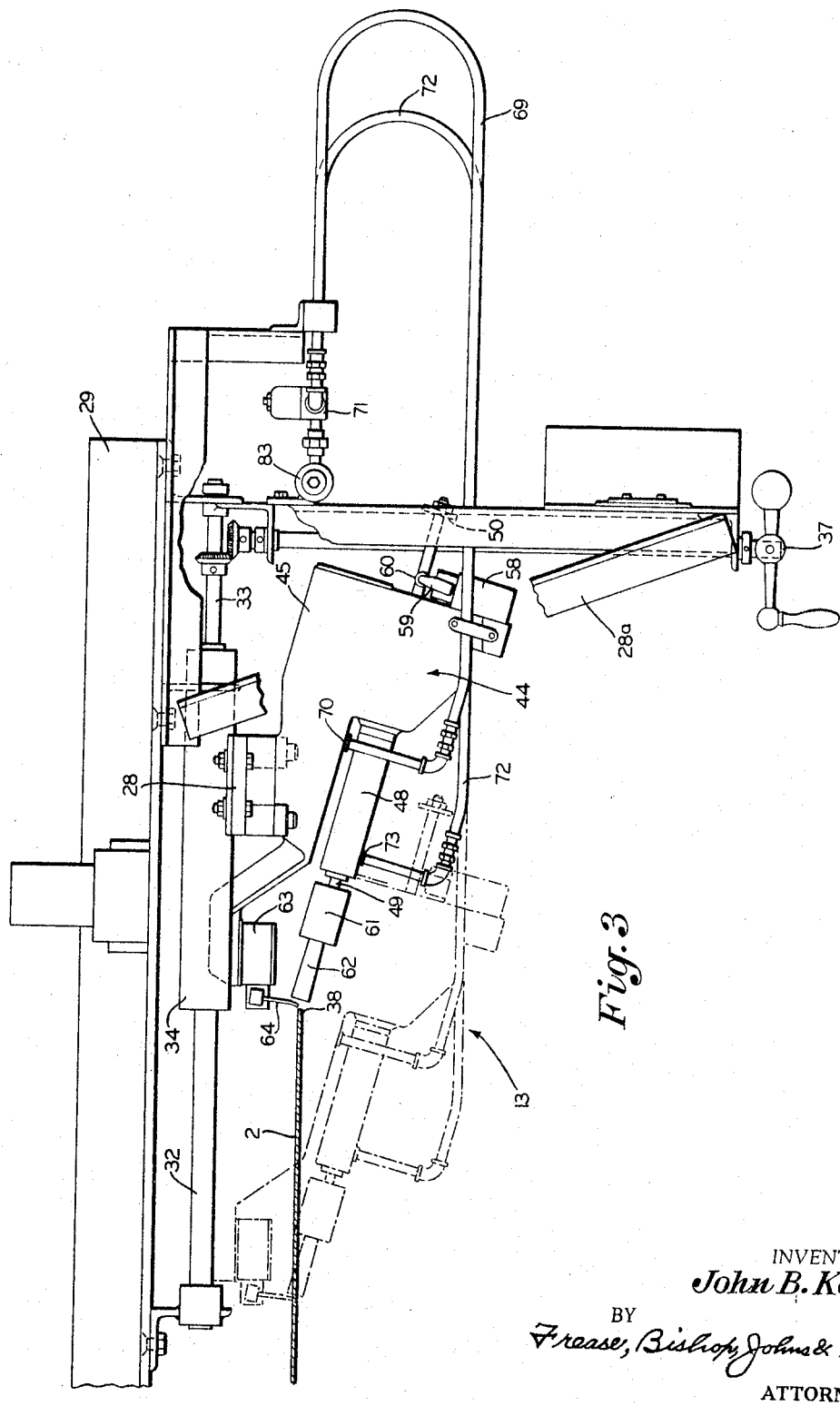
FIG. 3 is an enlarged view of the chalk marking device looking in the direction of the arrows 3—3, FIG. 4.
Figure 4:
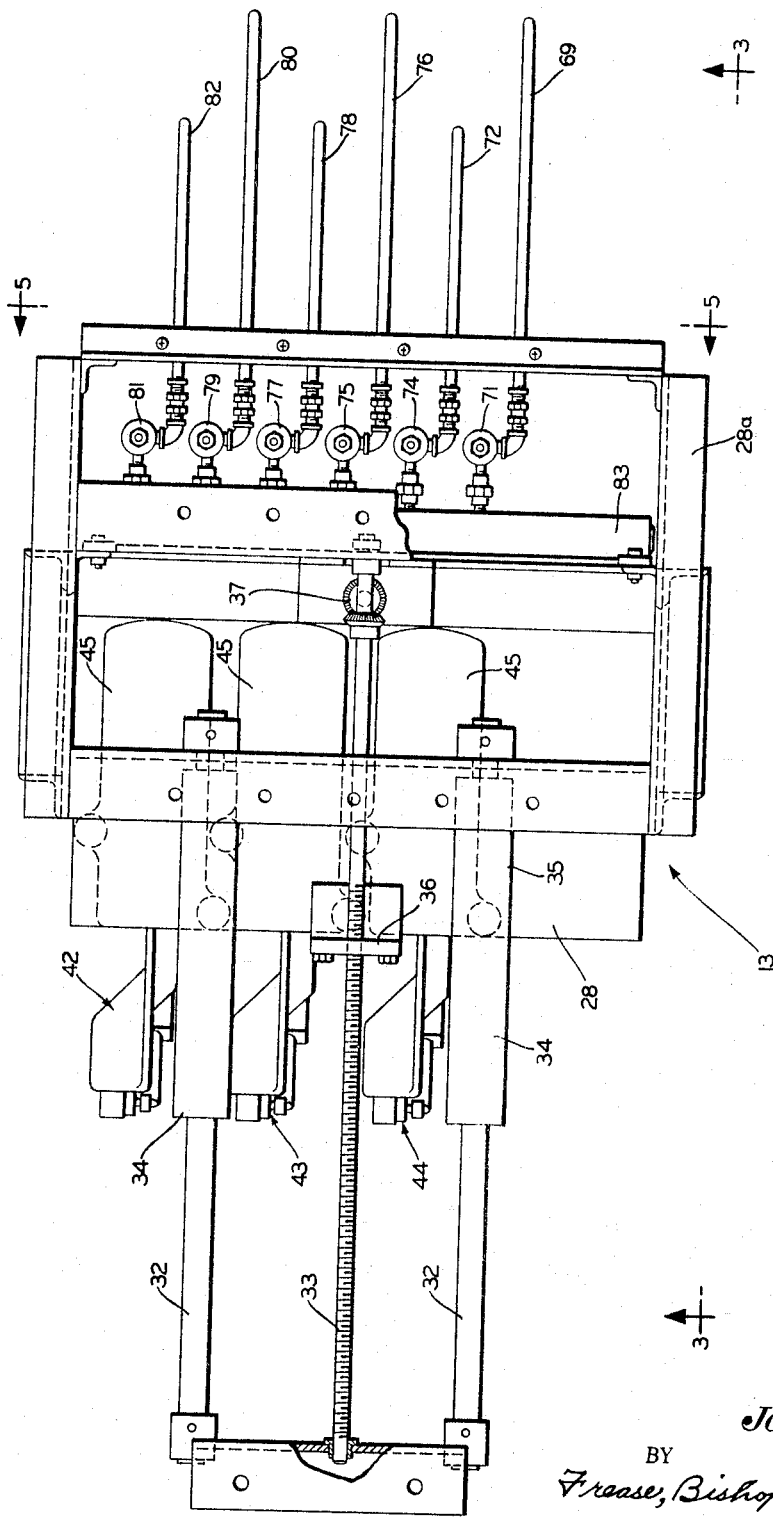
FIG. 4 is a top plan view of the parts shown in FIG. 3.
Figure 5:
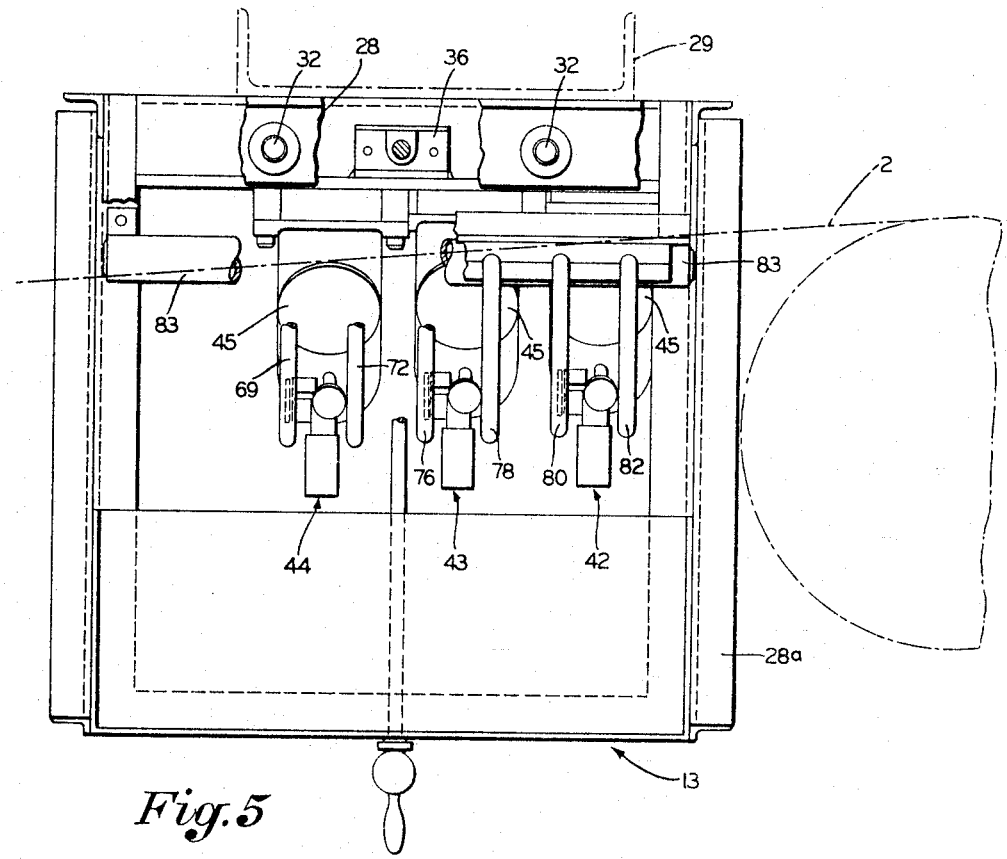
FIG. 5 is an outer end view of the parts shown in FIG. 3 looking in the direction of the arrows 5—5, FIG. 4.

The adjustable support for frame 28 preferably includes a spaced pair of slide rods 32 (FIGS. 3, 4 and 5) and an adjusting screw 33 mounted on channel member 29; and slide tubes 34 telescoped over slide rods 32 and fixed at 35 to frame 28, and a nut 36 fixed to frame 28 and engaged with screw 33. A suitable crankshaft and gear mechanism 37 may be mounted on fixed frame 28a for rotating screw 33 to adjust frame 28 to the right or left (FIGS. 2, 3 and 4) at a desired location with respect to the back edge 38 of paper web 2, depending upon the width of the web. A range of adjustment is shown in full and in dot-dash lines in FIG. 3.

In accordance with the invention, the chalk marking device 13 includes a chalk marker unit associated with each electronic flaw detecting scanner 22, 23 and 24. As shown, three chalk marker units 42, 43 and 44 are provided, front marker 42 being associated with front scanner 22, center marker 43 being associated with center scanner 23, and back marker 44 being associated with back scanner 24.

The marker units 42, 43 and 44 are mounted at 45 on frame 28 so as to be adjustable with the frame. Marker units 42, 43 and 44 are located at various levels (FIG. 1) in alignment with the path of travel of the edge of web 2, as shown.

Referring to FIGS. 3 to 9, each marker unit, such as unit 44, preferably includes a housing 45 forming a drive chamber 46 and an air chamber 47. An air cylinder 48 is mounted on housing 45 having a piston therein provided with a piston rod 49 extending forwardly from the front of cylinder 48 (to the left—FIG. 6). The piston rod 49 also extends through drive chamber 46 and projects from the rear of housing 45 where its free end carries a stop member 50. A helical driven gear 51 is keyed to piston rod 49 within drive chamber 46 and is in mesh with helical drive gear 52 also mounted within drive member 46 on countershaft 53. Countershaft 53 is keyed at 54 to housing 45 and drive gear 52 is rotatable in one direction on shaft 53. An overrunning clutch 55, having restraining roller means 56 (FIG. 9) is interposed between gear 52 and shaft 53 so that gear 52 can rotate in one direction on shaft 53 but is held by fixed shaft 53 and restrained against rotation in the opposite direction.

A spring-pressed brake shoe 57 bears against piston rod 49 normally to retard rotation of piston rod 49 and to assist in holding piston rod 49 in any adjusted longitudinal position. A limit switch 58 preferably is mounted on housing 45 having an actuator arm 59 provided with roller 60 adapted to be engaged by stop member 50 when piston rod has moved to the left to its limit of movement.

A chalk holder 61 is mounted on the front end of piston rod 49 and a piece of chalk 62 is mounted on and projects forwardly of chalk holder 61.

Another limit switch 63 is mounted on housing 45 having an actuator finger 64 provided with a pad 65 adapted to be engaged by chalk member 62 when the latter is moved forwardly to the left (FIG. 6) to engage the edge 38 of paper web 2.

A U-shaped hose, pipe or conduit 66 communicates between air chamber 47 at 67 and the rear of cylinder 48 behind the piston therein at 68. A flexible conduit 69 connects at 70 with air chamber 47 and at its other end with a normally open three-way solenoid operated valve 71.

Another flexible conduit 72 is connected at 73 with the front of cylinder 48 ahead of the piston therein and is connected at its other end to a normally open three-way solenoid operated valve 74.

Similarly, valve 75 is connected by flexible conduit 76 through an air chamber with the rear of the cylinder of marker unit 43; and valve 77 is connected by a flexible conduit 78 with the front of cylinder of marker unit 43.

Similarly, valve 79 is connected by flexible conduit 80 through an air chamber with the rear of the cylinder of marker unit 42; and valve 81 is connected by flexible conduit 82 with the front of cylinder of marker unit 42. All of valves 71, 74, 75, 77, 79 and 81 are connected to a common manifold 83 supplied with compressed air from a suitable source.

Figure 10:
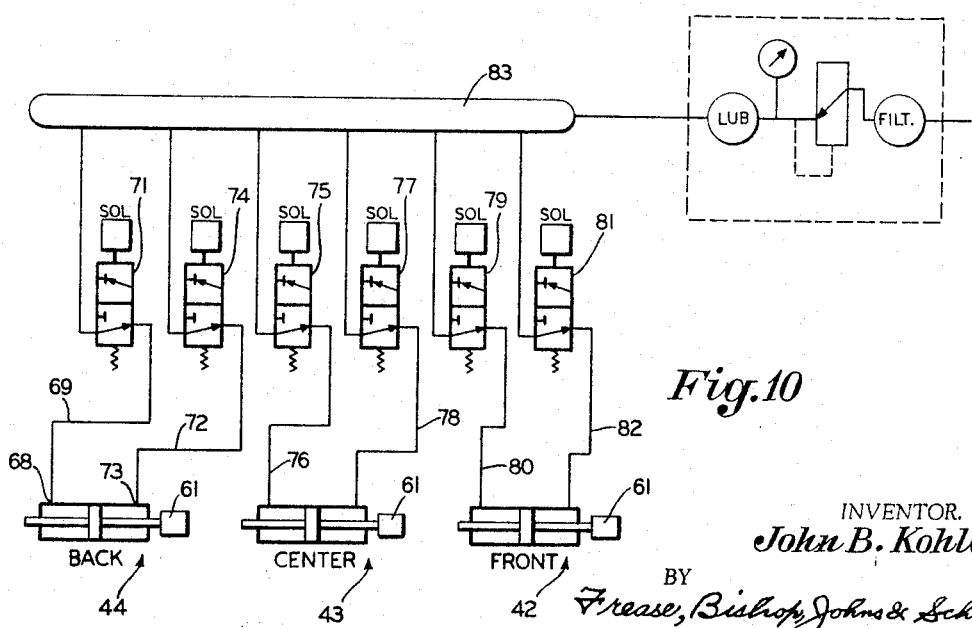
FIG. 10 is a piping diagram for the chalk marking device.

All of valves 71, 74, 75, 77, 79 and 81 preferably are spring offset (FIG. 10) one way in the normally open position and are electrically offset by solenoids the other way. The valves being connected with the common manifold 83 in normally open position as shown, supply and maintain balanced system pressure in both ends of the cylinders 48 against the respective pistons therein, for each of the marker units 42, 43 and 44.

In the operation of the improved apparatus, a flaw in the paper of moving web 2, say in the back zone thereof scanned by scanner 24, is detected by scanner 24 and generates an impulse in the electronic circuitry thereof. Marker unit 44 associated with scanner 24 is controlled thereby and its elements may be assumed to be in the position shown in FIGS. 3 and 6. A control relay, not shown, is operatively connected with the circuitry of scanner 24 and with the solenoids of valves 71 and 74.

The impulse of a detected flaw generated in the electronic circuitry of scanner 24 actuates the relay to establish a circuit to the solenoid of valve 74. The solenoid of valve 74 when energized moves valve 74 from normally open position to a position in which pressure in conduit 72 bleeds from front of cylinder 48 to the atmosphere. Meanwhile, valve 71 remains open being held by the spring in open position in which air continues to pass from manifold 83 through conduit 69 and chamber 47 to the rear of cylinder 48.

Figures 6, 9:
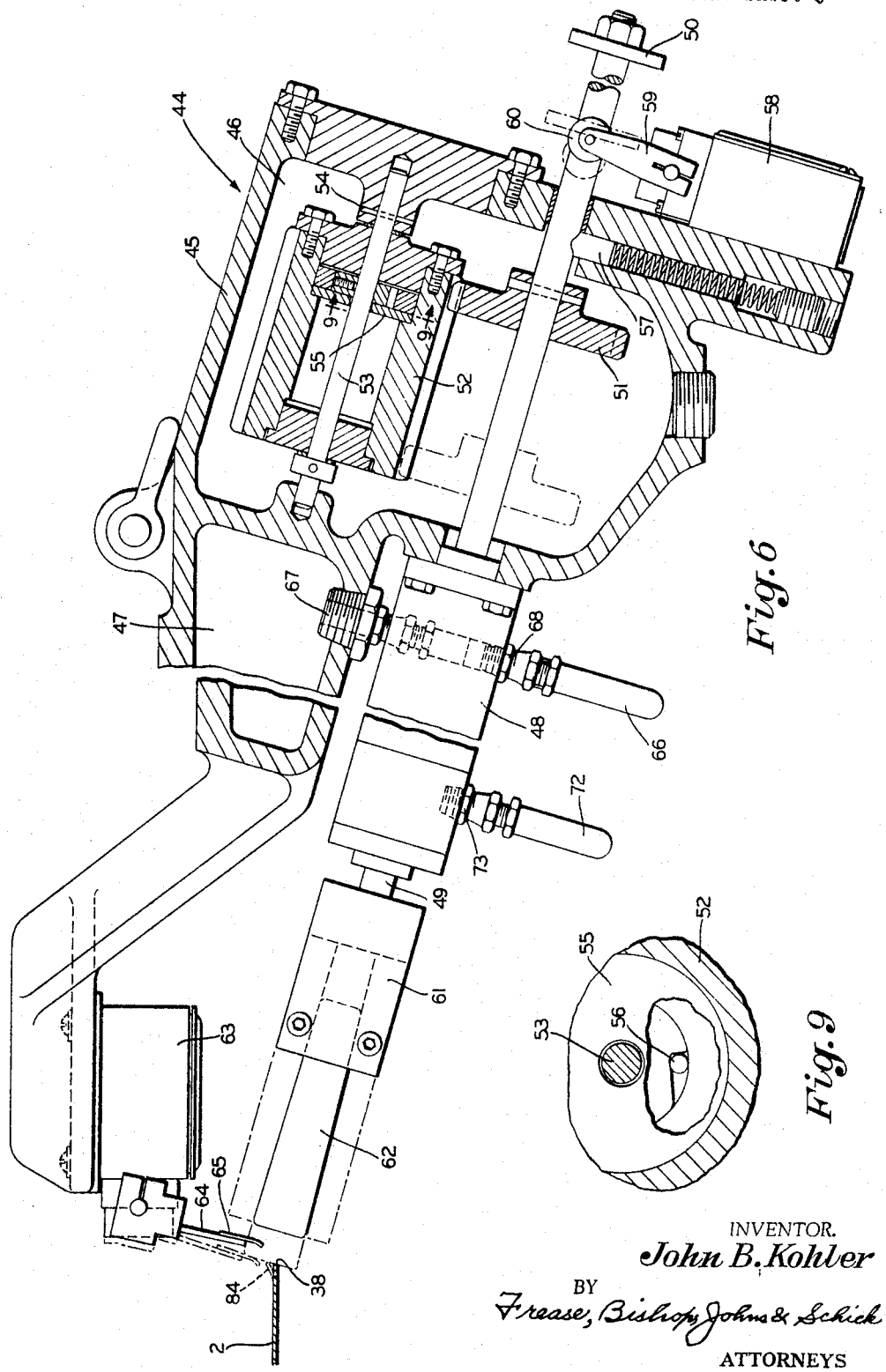
FIG. 6 is an enlarged sectional view of one of the chalk marking devices.
FIG. 9 is a fragmentary section taken on the line 9—9, FIG. 6.

The bleeding of pressure from the front end of cylinder 48 through conduit 72 and valve 74 to the atmosphere permits the system pressure in the back end of cylinder 48 to move the piston rod 49 toward the left (FIG. 6). This movement continues until the forward end of chalk member 62 contacts the edge 38 of web 2. At the same time that the web edge contact by chalk 62 is established, the end of chalk 62 has engaged and moved pad 65 of limit switch 63 to the position shown in dot-dash lines in FIG. 6. In this position switch 63 deenergizes the solenoid of valve 74 which returns to normally open position and balanced pressure on both ends of piston 48 is again established. Thus, further movement of piston rod 49 is stopped and chalk member 62 is held in contact with the web edge 38 and continues to mark such edge. Meanwhile, piston rod 49 in moving forward carries gear 51 with it. Gear 51 meshes with gear 52 which overruns and thus rotates on shaft 53. At the same time brake shoe 57 holds piston rod 49 against any tendency to rotate.

A set time period after initial action of the relay, determined by the time setting in the flaw detector circuitry, the relay reverses to normal position. During this time period chalk member 62 remains in marking position to place a chalk mark on the edge 38 of web 2. In some instances, the edge 38 of web 2 may curl slightly due to the particular position of the end of chalk member 62, as indicated at 84 in FIG. 6. This may result in a chalk mark on a surface of the web adjacent edge 38 in addition to the edge marking of the web.

At the time when switch 63 moved to the dot-dash position of FIG. 6 and deenergized the solenoid of valve 74, it set up a circuit through which the solenoid of valve 71 subsequently could be energized. At the end of the set time period after initial action of the control relay, the relay reverses to normal position, whereupon the setup circuit for the solenoid of valve 71 is energized moving valve 71 to a position in which pressure in conduit 69 bleeds from the rear of cylinder 48 to the atmosphere.

The bleeding of pressure from the rear of cylinder 48 through conduit 69 and valve 71 to the atmosphere permits the system pressure in the front of cylinder 48 to move piston rod 49 toward the right (FIG. 6). This movement continues until the forward end of chalk member 62 releases pad 65 of limit switch 63, permitting switch 63 to reset to normal position shown in full lines in FIG. 6. In this normal position, switch 63 deenergizes solenoid of valve 71 which returns to normally open position.

Upon the return of valve 71 to normally open position, and since valve 74 similarly was in normally open position, balanced pressure again is established at both ends of cylinder 48 stopping the return stroke of piston rod 49 toward the right at a position such as shown in full lines in FIG. 6 with chalk element 62 out of contact with and ceasing to mark the edge 38 of web 2. The buildup of pressure to stop the return stroke is slowed down or delayed because of chamber 47 in which a pressure buildup must also occur when valve 71 returns to normally open position.

Meanwhile, piston rod 49 in moving toward the right (FIG. 6) carries gear 51 with it. Gear 51 is in mesh with gear 52 but rotation of gear 52 in the opposite direction is prevented. Thus, gear 51 and piston rod 49 must rotate through an arc determined by the pitch of the helical gears and the amount of movement of piston rod 49.

The rotation of piston rod 49 indexes chalk element 62 to a rotated position such that new surfaces at the end of chalk element 62 are presented for contact with the edge 38 of web 2 the next time that chalk marker 44 is actuated. The indexing of chalk element 62 prevents a slot from being cut in the end of chalk element 62 by the edge of web 2 by repeated engagement of chalk element 62 in the same position with the edge 38 of web 2.

The chalk element 62 will wear down during continued use, or the element 62 accidentally can be broken. As a result, piston rod 49 moves further to the left when marker 48 is actuated. The condition of no chalk available for edge contact with web 2 is signalled when piston rod 49 moves to the left to a position in which stop member 50 engages roller 60 and actuates member 59 of chalk marker switch 58. Actuation of switch 58 before actuation of switch 63 energizes a circuit to a signal such as a light or an alarm indicating chalk depletion.

Any flaw in the front or center portion of web 2 is detected by front or center scanner 22 or 23 to similarly actuate marker units 42 or 43 in the manner described.

Markers 42, 43 and 44 may be supplied with chalk elements 62 of different colors so that the edge chalk marking will not only indicate and signal the existence of a flaw but also its location at the front, center or back of the web crosswise thereof.

The edge chalk marking of web 2 thus provides a signal mark visible at the end of the roll or paper collected at the exit end of the paper machine. Such visible signal indicates not only the existence, but also crosswise location of a flaw in the roll. The mill operater thus can visually inspect the end of the roll immediately and determine the absence of flaws or the number and location thereof.

FIG. 11 shows diagrammatically advantageous uses of the improvements of the invention. A paper web or strip passing through the paper mill indicated at 85 is scanned at 86 by flaw detector 87 generating an impulse signal upon the passage of a flaw past zone 86 in circuitry 88 having a timer 89 which actuates chalk marker 90 in response to the impulse signal to provide a mark on an edge of web 91 in fixed lineal relationship to the position of the related flaw on the web. Timer 89 causes the mark to be continued for such time period or length of web that when the web is wound into a resulting roll of paper 92 on reel 95, a signal mark 94 appears as a ring on the end of the roll of paper.

Timer 89 may be adjusted to extend the mark 94 on the edge of the web 91 for such period of time or length of the web as is desired.

The wound roll of paper 92 then may be unwound as at 92a on a rewinder generally indicated at 93. The visible ring marks 94 on the roll 92a as the paper is unwound from payoff reel 95a and rewound on winder 96 signal the approach of any flaw-containing area. Thus, the unwinding may be slowed down for visible flaw inspection in accordance with the location of flaws signalled; and the unwinding from payoff reel 95a may be stopped to remove flaw-containing areas when desired.

The edge chalk marking is advantageous from a number of standpoints. The length of the mark can be controlled by adjusting the time setting of the relay in the electronic circuitry of the flaw detector. This mark normally will be made long enough to appear on a length of paper forming several turns of the reel. Each mark thereby appears as a ring on the end of the completed reel. Flaw signals are visible before the roll is unwound.

The start of the mark bears a close relationship to the lineal position of the flaw. It can be held within a foot thereof. However, the mark is read when the reel is being unwound in a next processing step. Therefore, the start of the mark as it was made is now the tail end of the mark as it leaves the reel.

The operator controlling the unwinding operation can readily see that he is approaching the marked ring and can slow down unwinding, which may have as high a speed as 6,000 feet per minute. Then he sees the actual mark running along the edge of the web and can conveniently stop unwinding at the tail end of the mark. At this time the flaw is in a convenient position for inspection, or removal.

The marking is present in that portion of the web which is normally edge-trimmed. Marked and rejected paper can be returned directy to the pulp machine because chalk-marked paper is repulpable. This last condition normally does not pertain to paper marked with ink to indicate the presence of a flaw, since usual inks are not repulpable.

Accordingly, the improved flaw detecting and marking apparatus provides for the high speed detection and marking of the edge of the web of a paper machine during continuous movement with selective chalk marks indicating the presence as well as the location of flaws and forming a signal for each flaw, visible externally at the end of a roll of paper produced, of the presence and location of each flaw; provides a construction which eliminates difficulties heretofore encountered in the art; provides for 100 percent inspection of a paper machine product by which quality of the product is insured whether in roll or sheet form, paper machine trouble is detected and corrected quickly, production costs are reduced, and the final product is upgraded; provides a construction which can be installed on existing paper machines; provides a construction satisfying all of the indicated objectives; and provides a construction which solves problems and satisfies needs that have existed in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. For instance, when continuous strip material is collected in a roll, the resultant roll is sometimes referred to as a roll, a reel or a coil.

Moreover, the description and illustration of the invention is by way of example and the scope of the invention is not limited to the exact structures, sizes, speeds, etc., illustrated or described because these may be varied without departing from the fundamental principles of the invention.

For example, cross web scanning actuated by reflected light which may generate a signal through coincidence circuitry have been described. The scanning, however, may be accomplished by flat-viewing, or with show-through lighting, and may generate a signal by other electronic circuitry to control operation of the chalk markers.

Having now described the features, discoveries and principles of the invention, the assembly, operation, adjustment, use and characteristics of a preferred form thereof, and the advantageous, new and useful results obtained thereby; the new and useful discoveries, principles, apparatus, combinations, parts, elements, subcombinations, arrangements, constructions, controls, and cooperative relationships, and mechanical equivalents obvious to those skilled in the art are set forth in the appended claims.

I claim:

1. Flaw detecting and marking apparatus for high speed continuous web paper machines including, electronic flaw detector means having a plurality of light actuated web scanning devices and circuitry to initiate a signal impulse in response to the passage of a detected flaw on a continuously moving paper web past any such scanning device; said scanning devices being adapted to scan one each of a plurality of different predetermined longitudinally extending zones of a continuously moving paper machine web; chalk marking means including a separate chalk marking device associated with each scanning device operable to mark an edge of the web during continuous web movement with a selective chalk mark in response to a scanning device signal impulse in the circuitry of the scanning device associated with such marking device, thereby forming for each flaw a chalk mark signal visible externally at an end of a roll of paper produced by a paper machine indicating the presence and location of such flaw; and control means operatively connecting each scanning device with its associated chalk marking device actuated by the signal impulse initiated in the circuitry of such scanning device to operate such associated chalk marking device.

2. Flaw detecting and marking apparatus as defined in claim 1 in which the separate chalk marking devices associated one with each scanning device include differently colored shalk members to selectively mark the zone location of detected flaws.

3. The method of detecting and marking flaws in a continuously moving strip including the steps of inspecting the continuously moving strip with flaw detector means operative to deliver a separate signal upon the passage of each flaw past the detector means; signal marking an edge of the strip with colored material in response to the occurrence of each such detector signal with one end of each such mark on the strip edge in fixed lineal positional relationship to the position of the related flaw on the strip; continuing the marking for each flaw a predetermined time such that when the strip is wound into a roll each signal mark appears as a ring on the end of the roll; and winding the strip into a roll whereby the signal ring marks visibly indicate the presence and location of all such flaws at the end of the wound roll.

4. The method of locating flaws in a continuously moving strip including the steps of inspecting the continuously moving strip with flaw detector means operative to deliver a separate impulse upon the passage of each flaw past the detector means; signal marking an edge of the strip with colored material in response to the occurrence of each such impulse with one end of each such mark on the strip edge in fixed lineal positional relationship to the position of the related flaw on the strip; continuing the marking for each flaw a predetermined time such that when the strip is wound into a roll each signal mark appears as a ring on the end of the roll; winding the strip into a roll; unwinding the roll; slowing the speed of unwinding for visual flaw inspection in accordance with the location of flaws signalled by said ring marks, and stopping unwinding to remove flaw-containing areas from the strip.

5. The method set forth in claim 4 in which the flaw detector means generates a separate electrical impulse upon the passage of each flaw past the detector means; in which the signal marking is carried out with solid colored material; and in which the signal marking in response to the occurrence of each electrical impulse is controlled for a predetermined period of time after the generation of such electrical impulse.

6. The method of detecting and marking flaws in a continuously moving paper web including the steps of inspecting the continuously moving web with flaw detector means operative to deliver a separate signal upon the passage of each paper flaw past the detector means; signal marking an edge of the web with chalk in response to the occurrence of each such detector signal with one end of each such chalk mark on the web edge in fixed lineal positional relationship to the position of the related flaw on the web; continuing the marking for each flaw a predetermined time such that when the web is wound into a roll of paper each signal mark appears as a ring on the end of the roll; and winding the web into a roll whereby the signal ring marks visibly indicate the presence and location of all such flaws at the end of the wound roll.

7. Flaw detecting and marking apparatus for continuously moving strip material including, flaw detector means positioned to inspect at least one longitudinally extending surface zone of a continuously moving strip operative to signal the passage of each flaw in such a zone past the detector means; edge marking means having a marking element engageable with an edge of the continuously moving strip; control means for the edge marking means operative to actuate the edge marking means to engage an edge of the strip in response to a signal from said detector means; said control means including timing means for controlling the duration of each edge marking operation for a predetermined time; and reel means for reeling the strip into a roll; whereby each edge mark has a fixed lineal position on the edge of the strip relative to the location of the related flaw on the strip surface, and whereby each mark formed on the edge of the strip for each flaw has a length such as to be visible as a ring on the end of the roll indicating the presence and location of a flaw.

References Cited by the Examiner
UNITED STATES PATENTS

| | | | |
|---|---|---|---|
| 2,254,197 | 9/1941 | Andre | 73—159 |
| 2,282,929 | 5/1942 | Billstein | 346—141 |
| 2,812,447 | 11/1957 | MacMartin et al. | 250—219 X |
| 2,834,206 | 5/1958 | Mindheim et al. | 73—159 |
| 2,896,196 | 7/1959 | Hartford et al. | 73—159 X |
| 2,939,963 | 6/1960 | Rideout | 250—219 |
| 3,051,956 | 8/1962 | Theobald | 346—141 |

DAVID SCHONBERG, *Primary Examiner.*